Patented Jan. 11, 1949

2,458,703

UNITED STATES PATENT OFFICE 2,458,703

REDUCTION OF COMPOUNDS OF SILICON AND HALOGEN

David B. Hatcher, Toledo, Ohio, assignor to Libbey-Owens-Ford Glass Company, Toledo, Ohio, a corporation of Ohio No Drawing. Application June 11, 1947, Serial No. 754,073

6 Claims. (Cl. 23—14)

The invention relates to the reduction of compounds of silicon and halogen by a reaction in which halogen is replaced by hydrogen. Silicon compounds containing hydrogen are necessary for certain commercially important processes, but are less readily available than more highly halogenated silicon compounds.

The principal object of the invention is to provide an economical and efficient method of reducing halogenated silanes. More specific objects and advantages are apparent from the description, which merely discloses and illustrates the invention and is not intended to impose limitations upon the claims.

Hurd Patent No. 2,406,605 describes the reaction of hydrogen with halogenated silanes in the presence of aluminum, magnesium or zinc. The patent states that the reaction probably takes place as the result of the formation of a hydride of the metal which reacts with the halogenated silane.

It has been found that when silicon is substituted for the aluminum, magnesium or zinc in the process described by the Hurd patent, the replacement of halogen in the halogenated silane by hydrogen does not take place, and the halogenated silane passes unchanged through the system.

The invention is based on the discovery that silicon actually reduces a halogenated silane in a hydrogen atmosphere when aluminum trichloride or tribromide is present. The present invention consists in a method of reducing a halogenated silane whose molecule contains at least one halo radical that is connected to silicon and is replaceable by hydrogen that comprises contacting silicon with a mixture of such silane, hydrogen and a substance of the class consisting of aluminum trichloride and aluminum tribromide at an elevated temperature.

The theoretical reaction in which a replaceable halo radical in a silane molecule is replaced by hydrogen is understood to take place according to Equation 1 below:

(1) 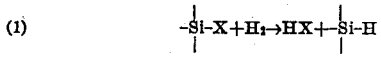

wherein X is halogen, preferably chlorine or bromine. Although any halogenated silane whose molecule contains at least one halo radical that is connected to silicon and is replaceable by hydrogen may be used in the practice of the invention (e. g. common silanes such as ethyl trichlorosilane, ethyl tribromosilane, methyl trichlorosilane, methyl tribromosilane, silicon tetrachloride, silicon tetrabromide, silicochloroform and silicobromoform), it is preferable to use one or more compounds having the following general formula:

wherein X is halogen and each of the radicals $R^1$, $R^2$ and $R^3$ is halogen or hydrogen. A compound having this general formula may be a monohalo-, dihalo-, trihalo- or tetrahalo-silane, but for economic reasons silicon tetrachloride and silicochloroform are preferred.

In actual practice the reaction of the invention yields a mixture of silanes reduced to a varying extent (i. e., some silane molecules lose more halogen atoms than others), and the amount of hydrogen contacted under reaction conditions with the silane to be reduced is determined to a great extent by the composition of the silane mixture desired. Accordingly, the molal ratio of $H_2$ to the silane to be reduced may range from the minimum ratio at which an appreciable reaction occurs (e. g. about 0.1:2) to the maximum ratio which is practical for commercial purposes (e. g. about 5:1). If it is desired to replace only a single halogen atom in the silane molecule, a molal ratio (of $H_2$ to the silane) of about 1:1 is usually preferable. The proportion of the hydrogen is increased correspondingly when it is desired to replace more than one halogen atom.

The silicon used in the practice of the invention is in the form of elementary silicon and may be present as powder or pellets, or as a single piece (e. g. forming the walls of the reaction chamber), or as a silicon alloy, such as a copper-silicon alloy. Silicon is consumed in the reaction and it is believed that the hydrogen halide, which is presumed to be formed in the reaction of Equation 1 (above), reacts with the elementary silicon contacted. The amount of silicon employed in the practice of the invention may range from the least amount that is required to enter into the reaction to a very great excess. Since the rate of the reaction depends to a great extent on the total surface area of the silicon exposed to the reactants as well as on the time of contact of the reactants with the silicon, it is generally preferable to use a reaction "bed" of granular silicon in a comparatively large quantity (e. g. 100–1000 times the weight of the silane in contact with the silicon).

The catalyst used is aluminum chloride ($AlCl_3$)

or aluminum bromide ($AlBr_3$). An anhydrous salt should be used as the catalyst because a hydrate (e. g. $AlCl_3.6H_2O$) may decompose at an elevated temperature without yielding an aluminum halide. Since the aluminum trihalide functions as a catalyst, it may be present in the reaction zone in usual catalytic quantities, ranging from a mere appreciable amount (e. g. about 0.1 mol per cent of the silane to be reduced) to the maximum amount in which a catalyst is usually employed (e. g. about 5 mol per cent of the silane to be reduced). There is no preferred amount of aluminum trihalide for the reaction in general, since the amount present is only one of many variables which determine the rate of reaction; but in the preferred procedure for carrying out the reaction (described hereinafter) about 1-2 mol per cent of the silane to be reduced is the most desirable amount of aluminum trihalide.

Metallic aluminum may be used as a source of aluminum trichloride or tribromide if a chloro or bromo silane is being reduced, because it is converted immediately to an aluminum trihalide which then functions as the catalyst. Thus finely divided aluminum may be incorporated in the silicon bed in an amount sufficient to provide the desired (catalytic) amount of aluminum trihalide; but the use of aluminum has certain practical disadvantages such as the high cost of aluminum, the difficulty of controllably adding the aluminum and the consumption of both aluminum and halogen in the process by reaction to form an aluminum trihalide.

The reaction is preferably carried out in a closed system, i. e., in the absence of any other reactants, such as moisture or oxygen, since the presence of moisture causes hydrolysis of the silanes and the presence of air (oxygen) causes oxidation of the reactants. In view of the fact that the reaction is endothermic, it is usually unnecessary to use a diluent for the purpose, for example, of controlling the reaction. In any case, if it is desired to use a diluent, it is preferable to use an inert gas such as nitrogen.

The reaction is carried out simply by contacting the silicon with the other ingredients (i. e., the silane to be reduced, hydrogen and the aluminum trihalide) at an elevated temperature and at any desired pressure. There is no particular pressure range in which the reaction must be carried out, but it is usually preferable for economic reasons to carry out the reaction at atmospheric pressure.

The reaction may be carried out by adding the ingredients to a closed vessel and then heating to the desired temperature, but in actual practice it is preferable to pass a vapor mixture of the silane to be reduced, the hydrogen and the aluminum trihalide through a hot bed of granular silicon. Since the reaction is endothermic, it is necessary to supply heat to maintain the reaction temperature, and this may be done by preheating one or more of the ingredients in the vapor mixture or by supplying external heat to the silicon bed or by any combination of such methods.

The elevated temperature at which the reaction is carried out may range from the lowest temperature which permits an appreciable reaction (e. g. about 300-400° C.) to the highest temperature to which the silanes present in the reaction may be subjected without undergoing substantial decomposition (e. g. about 1000° C.). The preferred temperature is determined by an economic balance with the other factors which influence the yield, such as the rate of flow, the amount of silicon present, the amount of aluminum trihalide present and the time of contact, but it is usually preferable for economic reasons to use the lower temperatures in the range.

The preferred and most easily controlled method of carrying out the reaction consists in passing a stream of preheated hydrogen through a tube containing a bed of heated granular silicon and controllably adding the desired amounts of the silane to be reduced and the aluminum trihalide to the hydrogen stream at the entrance of the tube by means of vaporizers. There is no minimum rate of flow for the hydrogen stream (since, as hereinbefore explained, the reaction takes place when the ingredients are brought into contact with each other at an elevated temperature), but the maximum rate of flow is determined by the desired length of time of contact between the ingredients in view of the other factors hereinbefore described as affecting the yield.

In the preferred procedure the gaseous mixture leaving the reaction chamber is cooled comparatively rapidly to a temperature (e. g. about 175° C. for $AlCl_3$) at which the aluminum trihalide condenses and is deposited. Then the silanes i. e., the unreacted as well as the reduced silanes) may be removed by condensers (e. g. ice and dry ice condensers equipped with traps) and separated (e. g. by distillation). The hydrogen then may be recycled, and the recovered aluminum chloride and unreacted silane may be reused.

One of the principal advantages of the instant invention is that the aluminum trihalide catalyst may be recovered almost completely and reused. Another advantage, which is particularly apparent in carrying out the preferred procedure, is that substantially no chlorine is present in the form of free chlorine ($Cl_2$) or hydrochloric acid (HCl) in the gaseous mixture leaving the reaction chamber, so that chlorine is not lost in the reaction and the corrosion problem in an industrial application of the reaction is greatly reduced. Since the results of experimental work indicate that the hydrochloric acid, which is presumed to be formed in the reaction in accordance with Equation 1 (above), reacts with the elementary silicon present, still another advantage is the production of further yields of valuable silanes in this manner.

*Example*

A halogenated silane is reduced by contacting silicon with a mixture of the silane, hydrogen and aluminum trichloride or tribromide at an elevated temperature, for example, by contacting silicon with a mixture of silicon tetrachloride, hydrogen and aluminum chloride according to the following procedure:

A stream of commercially pure hydrogen (approximately 1-1.75 liters per minute if measured at 0° C. and 760 mm. of mercury) is passed through a vaporizer containing a halogenated silane (silicon tetrachloride) at ordinary temperatures (30-50° C.), so as to introduce the silane vapor into the stream at a rate of approximately 2 grams per minute. (A still better way of introducing the halogenated silane is to add it dropwise through an orifice into a heated stream of hydrogen.) The resulting gaseous mixture is then passed through a bed of granular silicon (500 grams of pea-sized pellets) in a reaction chamber consisting of a stainless steel tube equipped with a controllable heat source (i. e., Chromel A wire wound around the tube) and with thermometers located at the exit and at a point near the inlet end of the tube to indicate the temperatures of the heated gaseous mixture at these points. During the reaction, heat is supplied to maintain the temperature of the gaseous mixture at the point near the inlet at 310–350° C. and at the exit at 320–350° C. A small amount of aluminum chloride is placed at the inlet of the tube and is heated so as to introduce aluminum trichloride vapor into the gaseous mixture at a rate of approximately 20 milligrams per minute. The time of contact in seconds (T), which is maintained at 45–60 seconds during the reaction, is calculated by the following formula:

$$T = \frac{60\pi r^2 l}{1000R}$$

wherein r is the inside radius of the tube in cm., l is the length of the silicon bed in the tube in cm. and R is the rate of flow of the gaseous mixture in liters per minute. The gaseous mixture passing out of the reaction chamber is progressively cooled in a section of tubing exposed to the air, in a water condenser and finally in ice and dry ice condensers equipped with traps. The aluminum trichloride is condensed and deposited on the walls of the section of tubing exposed to the air, and the unreacted and the reduced silanes (e. g. silicon tetrachloride, silicochloroform and dichlorosilane) are recovered from the traps. The silanes recovered from the traps may be separated easily by distillation, since the boiling points of such silanes (at atmospheric pressure) are comparatively far apart, as follows:

| | °C. |
|---|---|
| Silicon tetrachloride (SiCl4) | 57 |
| Silicochloroform (SiHCl3) | 31.5 |
| Dichlorosilane (SiH2Cl2) | 8 |
| Monochlorosilane (SiH3Cl) | 30.4 |

Of course, any silane (SiH4, which has a boiling point of −112° C.) formed during the reaction is not condensed in a dry ice trap.

A procedure is carried out which is the same as that described in the foregoing paragraph, except that the aluminum trichloride is not added. The halogenated silane passes through the reaction chamber unreacted and is condensed and recovered from the traps. The silane so recovered is tested qualitatively for the presence of a Si–H bond by dissolving slowly a small portion (5 ml.) of the silane in water (50 ml.) at room temperature, a gel being formed. A substantial excess of sodium hydroxide is added to the solution over that required to make the solution basic (using methyl orange indicator) and no evolution of hydrogen is observed. In contrast, if the product recovered from the traps when the reaction is carried out employing aluminum trichloride (as described in the foregoing paragraph) is tested qualitatively in the same manner, a very noticeable evolution of hydrogen occurs, indicating the presence of Si–H bonds.

A material balance obtained in the reaction described in the preceding paragraph indicates that very little halogenated silane is lost or unaccounted for in the reaction; for example, when a total of 140 grams of silicon tetrachloride is passed through the reaction chamber the product (unreacted silicon tetrachloride) recovered in the traps amounts to 131 grams, and the amount of silicon tetrachloride which passes completely through the condensers (probably by entrainment) is found to be about 2.4 grams as the result of a quantitative determination of the chlorine ions present in the water used to scrub the hydrogen leaving the last (dry ice) condenser.

Ethyl trichlorosilane, ethyl tribromosilane, methyl trichlorosilane, methyl tribromosilane, silicon tetrabromide, silicochloroform and silicobromoform may be reduced also by the procedure described in the first paragraph of the example to form the corresponding reduction products.

Having described the invention, I claim:

1. A method of reducing a halogenated silane whose molecule contains at least one halo radical that is connected to silicon and is replaceable by hydrogen that comprises contacting silicon with a mixture of such silane, hydrogen and a substance of the class consisting of aluminum trichloride and aluminum tribromide at an elevated temperature.

2. A method of reducing a compound having the general formula

in which X is halogen and each of the radicals $R^1$, $R^2$ and $R^3$ is of the class consisting of halogen and hydrogen, that comprises contacting silicon with a mixture of such compound, hydrogen and a substance of the class consisting of aluminum trichloride and aluminum tribromide at an elevated temperature.

3. A method of reducing silicon tetrachloride that comprises contacting silicon with a mixture of silicon tetrachloride, hydrogen and a substance of the class consisting of aluminum trichloride and aluminum tribromide at an elevated temperature.

4. A method of reducing silicochloroform that comprises contacting silicon with a mixture of silicochloroform, hydrogen and a substance of the class consisting of aluminum trichloride and aluminum tribromide at an elevated temperature.

5. A method as claimed in claim 3 in which the substance is aluminum chloride.

6. A method as claimed in claim 4 in which the substance is aluminum chloride.

DAVID B. HATCHER.

No references cited.